United States Patent

Freeland

[15] 3,675,559
[45] July 11, 1972

[54] PENDULOUS TYPE RANGEFINDER FOR OPTICAL INSTRUMENT

[72] Inventor: Stanley R. Freeland, Glenview, Ill.
[73] Assignee: Bell & Howell Company, Chicago, Ill.
[22] Filed: Dec. 31, 1969
[21] Appl. No.: 889,761

[52] U.S. Cl. .................................. 95/44 C, 95/45, 352/140
[51] Int. Cl. ................................................... G03b 3/00
[58] Field of Search ........................ 95/44 C, 45; 352/140

[56] References Cited

UNITED STATES PATENTS

| | | | |
|---|---|---|---|
| 3,538,832 | 11/1970 | Koeber | 95/44 C |
| 3,538,833 | 11/1970 | Koeber | 95/44 C |
| 3,572,230 | 3/1971 | Freeland | 95/44 C |
| 3,550,517 | 12/1970 | Mueller | 95/44 C |

*Primary Examiner*—Samuel S. Matthews
*Assistant Examiner*—E. M. Bero
*Attorney*—Finnegan, Henderson & Farabow and William F. Pinsak

[57] ABSTRACT

A pendulous type rangefinder for a camera is provided that can be adjusted either manually or automatically without having to either engage or disengage the manual adjustment with the pendulous member of the rangefinder. The rangefinder includes an objective lens system having a focusing element and comprises a pendulous member supported on the camera housing for selective conditioning between a free-swinging first condition and a retained second condition, a cam surface on the pendulous member, and a focusing element positioning means frictionally engageable with the cam surface for moving the focusing element. Means are provided for continuously urging the positioning means toward the cam surface, and a manual control extending externally of the camera housing and always engaged with the pendulous member permits force applied to the manual control to be directly transmitted to the pendulous member for directly moving the pendulous member at all times.

14 Claims, 4 Drawing Figures

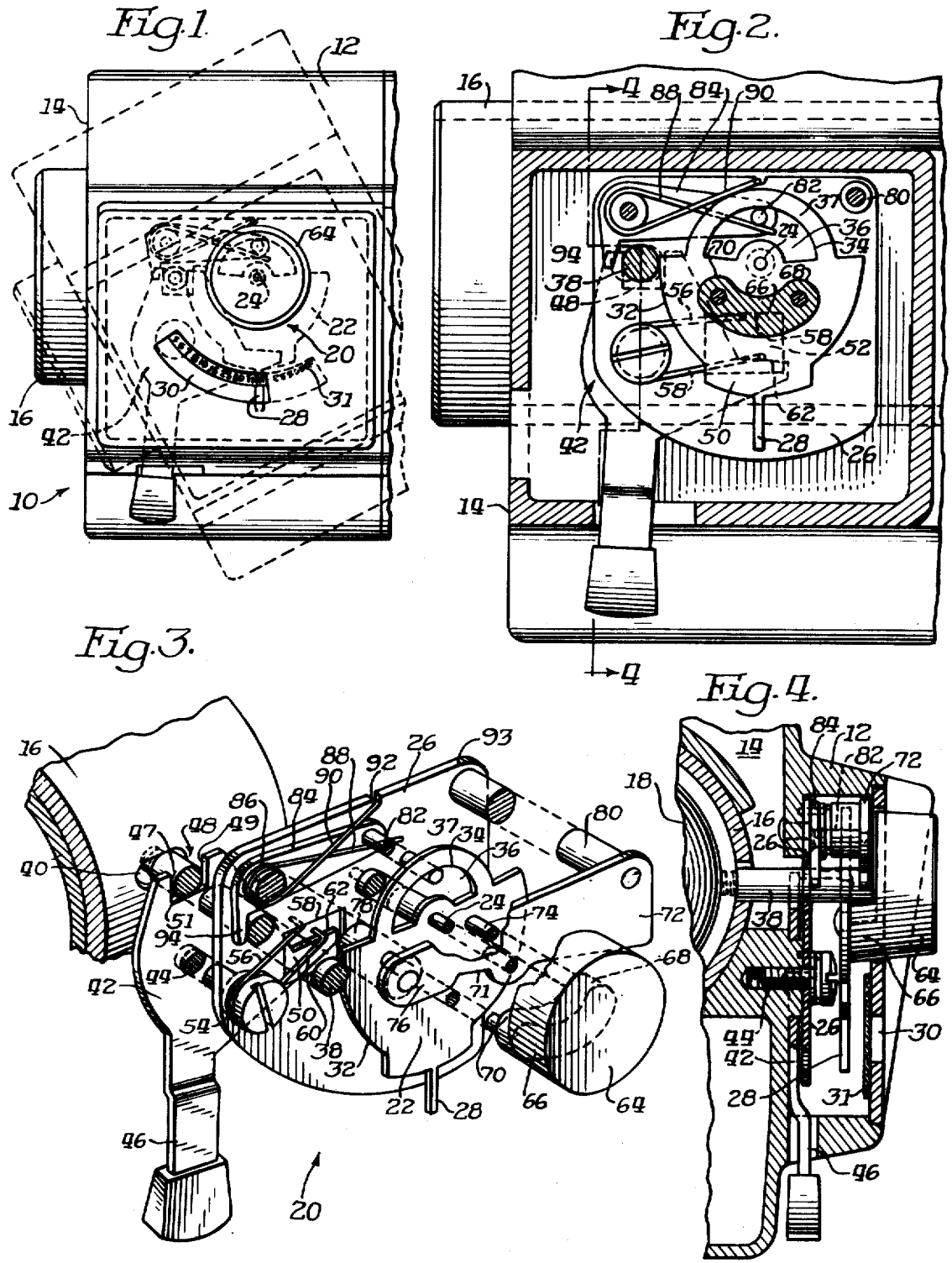

PENDULOUS TYPE RANGEFINDER FOR OPTICAL INSTRUMENT

This invention relates to an optical instrument having a focusable objective lens system which is adjustable according to distances which are determined by a pendulous rangefinder in accordance with the principles of triangulation, and more particularly to the focusing mechanism for such an instrument.

Pendulous rangefinders for determining the distance between an optical instrument, such as a camera, and a subject are known. Normally, the rangefinder includes a pendulous member that moves, relative to the optical axis of an objective lens system having a focusing element, to a position correlated to a distance determined by the inclination of the optical axis when the camera is aimed at the base of the subject. That is, the position of the pendulous member governs the adjustment of the focusing element to a position where the objective lens system is focused on the subject located at the determined distance.

The prior art has developed a pendulous rangefinder mechanism that can be used in a semi-automatic mode. It has also developed a rangefinder mechanism that can be used either in an automatic mode or in a manual focusing operation.

Throughout this specification, the term "manual focusing" will be used to describe a focusing operation in which a pendulous member is moved while it is in a retained condition, and the term "automatic" or "semi-automatic" will be used to describe a focusing operation that includes the step of moving a pendulous member while it is in an unretained or freely swingable condition.

When manual focusing of the prior art mechanisms is desired, it is necessary to first selectively engage a manual focusing means with the pendulous member of the rangefinder, and then proceed to manually focus the camera. The force applied to the manual focusing means to engage it with the pendulous member is not transmitted to the pendulous member and does not result in any movement of the pendulous member. To operate in an automatic mode, the manual focusing means must then be disengaged from the pendulous member of the rangefinder before proceeding with the automatic operation.

There has been, therefore, a need for a mechanism that can be used either manually or automatically without having to first positively change from one mode to the other and which directly transmits force applied to the manual focusing mechanism to the pendulous member for directly moving the pendulous member at all times.

Accordingly, the present invention provides a pendulous rangefinder mechanism which can operate either automatically or manually without having to be changed from one mode to the other.

Additional advantages of the invention will be set forth in part in the description which follows, and in part will be obvious from the description, or may be learned by practice of the invention. The advantages of the invention are realized and attained by means of the instrumentalities and combinations particularly pointed out in the appended claims.

The invention provides a range determining device for use with an optical instrument which has a housing and an objective lens system having a focusing element and comprises a pendulous member supported by the housing for selective conditioning between a free-swinging first condition and a retained second condition, a cam surface on the pendulous member, focusing element positioning means engageable frictionally with the cam surface for moving the focusing element, means engaged with the positioning means for continuously urging the positioning means toward the cam surface, and a manual control extending externally of the housing and always engaged with the pendulous member to permit force applied to the manual control to be directly transmitted to the pendulous member for directly moving the pendulous member at all times.

Preferably, the range determining device includes a brake engageable with the pendulous member for retaining the pendulous member in the retained second position, the retaining force of the brake being sufficient to prevent inadvertent movement of the pendulous member but being insufficient to prevent movement of the pendulous member by the manual control so that the manual control can positively position the pendulous member whenever the focusing element positioning means is engaged with the cam surface. The brake is disengageable from the pendulous member to permit the pendulous member to assume its free-swinging condition when the focusing element positioning means is disengaged from the cam surface.

Additionally, it is preferred to provide coupling means to selectively urge the brake into engagement with the pendulous member. This coupling means desirably includes a brake lever connected to the brake and movable between a first position where the brake engages the pendulous member and a second position where the brake is disengaged from the pendulous member, and a spring for urging the lever toward the first position.

It is also desirable to provide disengaging means for pivoting the coupling means to a second position where the brake is disengaged from the pendulous member.

The manual control preferably comprises a knob which extends externally of the housing and a limiting member connected to the knob. It is also desirable that there be a limiting plate positioned adjacent the limiting member and engageable with the limiting member for positively limiting the rotation of the manual control.

The accompanying drawings illustrate an example of a preferred embodiment of the invention, and, together with the description, serve to explain the principles of the invention.

IN THE DRAWINGS

FIG. 1 is a side elevation of a portion of a camera incorporating a pendulous rangefinder mechanism constructed in accordance with the teachings of the present invention;

FIG. 2 is an enlarged side elevation of a portion of the rangefinder of the invention as seen in FIG. 1, with certain parts omitted for purposes of clarity;

FIG. 3 is a partially exploded perspective view of the camera of FIG. 1 with the outer casing removed to show the operating parts; and FIG. 4 is a vertical section taken along line 4—4 of FIG. 2.

The drawings illustrate a camera, generally 10, having a housing including a first side wall 12 and a front wall 14. Extending from front wall 14 is a lens barrel 16 supporting an objective lens system including a focusing element 18 (FIG. 4). Focusing element 18 cooperates with a range determining device, generally 20, which has a focusing element positioning pin 38 that can adjust focusing element 18 forwardly toward and rearwardly away from front wall 14 along an optical axis defined by the axis of the objective lens system. By this adjustment, the focal plane of the objective lens system can be made coincident with a film plane of the camera so as to focus the image of a remote subject on that plane.

A pendulous member 22 is pivotally mounted for free-swinging movement on an axle 24 which is connected to support plate 26 and 72 which are in turn adjustably fixed relative to the lens system in the camera. A pointer 28 is integrally formed on the lower end of pendulous member 22 and moves relative to a window 30 in the camera housing. A distance scale 31 having a plurality of reference marks is mounted adjacent the window to provide a visual indication of the distance at which the objective lens system is focused. The scale is the same for both automatic and manual focus and, as will be explained hereinafter, provides a reference for manual adjustment of the focus of the objective lens system.

Pendulous member 22 contains a cam surface 32 located above pointer 28. The shape of cam surface 32 is designed to cause movement of focusing element positioning pin 38 between first position where the focus of the objective lens system is at infinity, and a second position where the objective lens system is adjusted for shorter focus. The engagement of positioning pin 38 with the upper portion of cam surface 32, as shown in FIG. 2, is the relative position of engagement when pendulous member 22 is adjusted to near its infinity position. When pendulous member 22 is adjusted to shorter focus positions, positioning pin 38 will be engaged relatively closer to the bottom portion of cam surface 32.

The top portion of pendulous member 22 contains a radial slot 36 that forms a ring-like portion 37 having a bottom surface 34 which acts as a braking surface as will be explained in more detail hereinafter.

In accordance with the invention, the range determining device includes focusing element positioning means frictionally engageable with the cam surface 32 for moving the focusing element 18. As here embodied, this means comprises the focusing element positioning pin 38, which is fixed to and extends from focusing element 18 to cooperate with cam surface 32. Pin 38 passes through an elongated slot 40 in lens barrel 16. Slot 40 is parallel to the optical axis of the objective lens system and is of sufficient length to permit pin 38 to move forward and rearward with the focusing element throughout the entire focus range of the focus element and also to permit pin 38 to have some overtravel beyond the shortest focus distance.

Means engaged with the focusing element positioning means are also provided for continuously urging the positioning means toward the cam surface. As here embodied, this means comprises an automatic focusing lever 42 pivotal about a shaft 44 that extends from support plate 26, and a spring 54, engaged with the focusing lever. Lever 42 includes an offset arm 46 that extends downwardly through an opening in side wall 12 of camera 10. The top of lever 42 has a substantially U-shaped groove 48 formed by parallel, spaced vertical sides 47 and 49 and a connecting horizontal side 51, and into which focusing element positioning pin 38 extends. Automatic focusing lever 42 has a projection 50 having a top surface 62 extending from the middle of lever 42 and overlying a rectangular opening 52 in support plate 26.

Spring 54 is secured to shaft 44 to continuously urge automatic focusing lever 42 against focusing element positioning pin 38 so that the positioning pin is held against cam surface 32. Spring 54 has a leg 56 which is engaged with a top horizontal side 58 of rectangular opening 52 and a leg 60 which is engaged with top surface 62 of projection 50 to continuously urge automatic focusing lever 42 in a clockwise direction toward cam surface 32.

A manual control is provided which extends externally of the camera housing and is always engaged with the pendulous member to permit force applied to the manual control to be directly transmitted to the pendulous member for directly moving the pendulous member at all times. In the present embodiment the manual control comprises a knob 64 which extends externally of the housing and a limiting member 66 extending into the housing from knob 64. Limiting member 66 has spaced limiting surfaces 68 and 70 which engage the bottom edge 71 of a limiting plate 72. Limiting member 66 is provided with spaced parallel shafts 74 and 76 which are engaged with pendulous member 22 and secure the limiting member to pendulous member 22. Limiting plate 72 is fixed to support plate 26 by means of spaced parallel shafts 78 and 80.

A brake mechanism is also provided which is engageable with the pendulous member for retaining the pendulous member in the retained second condition, the retaining force of the brake being sufficient to prevent inadvertent movement of the pendulous member but being insufficient to prevent movement of the pendulous member by the manual control so that the manual control can positively position the pendulous member whenever the positioning means is engaged with the cam surface of the pendulous member. The brake means is disengageable from the pendulous member to permit the pendulous member to assume its free-swinging first condition when the positioning means is disengaged from the cam surface. In the present embodiment, the brake comprises an elongated cylindrical frictional brake 82 that is engageable with braking surface 34 of radial slot 36 whenever positioning pin 38 is engaged with cam surface 32 of pendulous member 22. Frictional brake 82 extends outwardly from a brake lever 84 which is pivoted about shaft 78. Actuation of the brake mechanism is so timed that it always engages prior to the contact of pin 38 with cam surface 32.

The present preferred embodiment of this invention also includes coupling means to selectively urge the brake into engagement with the pendulous member. As here embodied, the coupling means comprises the brake lever 84 connected to brake 82 and movable between a first position, where the brake engages the pendulous member, and a second position, where the brake is disengaged from the pendulous member, and spring 86, for urging the brake lever toward the first position. Spring 86 continuously urges brake lever 84 in a counterclockwise direction so that frictional brake 82 can engage braking surface 34 of radial slot 36. Spring 86 has a leg 88 which is positioned under brake 82 and a leg 90 which is secured to a recess 92 in top edge 93 of support plate 26. Spring legs 88 and 90 cross each other to provide a force that continuously urges the legs toward each other which in turn urges brake lever 84 and frictional brake 82 in a counterclockwise direction.

Brake lever 84 has a downwardly extending projection 94 to give the lever an approximate L-shape and the lever is pivoted on shaft 78 about the intersection of the projection 94 with the remainder of the lever.

The range determining device also includes disengaging means for pivoting the coupling means to a second position where the brake is disengaged from the pendulous member. As here embodied, the disengaging means for pivoting the coupling means to the second position is focusing element positioning pin 38. Pin 38 is engageable with downwardly extending projection 94 of brake lever 84 and pivots the lever about a shaft 78. The positioning of the pivoting point of brake lever 84 are accurately determined with respect to positioning pin 38 so that at the end of forward travel of the pin, the pin contacts projection 94 of brake lever 84 to pivot lever 84 clockwise against the force of spring 86, thereby releasing frictional brake 82 from engagement with braking surface 34.

By using the focus pin 38 to disengage the brake, it is apparent to those skilled in the art that the geometry of the linkages can be so established that the brake always engages before pin 38 engages cam surface 32. The use of a brake is not always required by this invention but becomes necessary if "cam rise" is sufficiently steep so that pin 38 tends to drive pendulous member 22 when pin 38 bears on cam surface 32.

In operation, to automatically adjust the focus of the objective lens system, the subject is viewed through the camera's viewfinder system (not shown) at eye level by an operator of "average" height. The base of the subject is aligned on a reference mark in the viewfinder. In our preferred embodiment, this reference mark is centered vertically within the viewfinder. Assuming the subject to be located at a distance from the camera within focusing range of the objective lens system, the camera and the optical axis would be tilted downwardly. Pendulous member 22 is then released from an earlier adjusted position by manual actuation of arm 46 of automatic focusing lever 42 so as to rotate that lever. Automatic focusing lever 42 pivots about shaft 44 and causes side 49 of groove 48 to move focusing element positioning pin 38 out of engagement with pendulous member 22 and forwardly toward front wall 14. Movement of positioning pin 38 toward front wall 14 results in a corresponding movement of focusing element 18 toward front wall 14. The amount of movement of pin 38 must be sufficient to clear the pendulum in any position of the pendulum. When positioning pin 38 is removed from any possible engagement with cam 32, further motion of lever 42 results in contact of pin 38 with projection 94 of lever 84. Pin 38, then pivots brake lever 84 about shaft 78 to thereby release frictional brake 82 from engagement with braking surface 34, so that pendulous member 22 is now freely swingable.

Actuation of automatic focusing lever 42 holds focusing cell positioning pin 38 clear of cam surface 32.

While in a free-swinging condition, pendulous member 22 is oriented by gravity until focusing lever 42 is returned to its released position. The amount of relative rotation between the housing and pendulous member 22 (as suggested in dashed line position in FIG. 1) causes alignment of a particular portion of cam surface 32 for engagement by positioning pin 38. Automatic focusing lever 42 is held in its actuated condition for approximately 3 seconds to allow pendulous member 22 to reach equilibrium. The amount of time necessary for pendulous member 22 to reach equilibrium can be varied and depends on frictional dampening and pendulum characteristics. Upon release of automatic focusing lever 42, spring 54 urges the lever against positioning pin 38 and drives the pin 38 rearward of front wall 14. The return of positioning pin 38 towards engagement with cam surface 32 disengages the pin from its contact with projection 94 of brake lever 84 and spring 86 then urges brake lever 84 in a counterclockwise direction so that frictional brake 82 is once again engaged with braking surface 34 of radial slot 36. The positioning pin 38 is then allowed to contact cam surface 32 carrying focusing element 18 rearwardly and adjusts its position according to the orientation of pendulous member 22. Spring 54 biases positioning pin 38 against the cam surface radially of axle 24.

When it is desired to manually focus the objective lens system, as when the camera is mounted on a tripod, it is assumed that the distance to the subject has been earlier determined and it is necessary then to focus the objective lens system for that distance. To manually focus the objective lens system, knob 64 of the manual control is rotated either clockwise or counterclockwise depending on the desired distance and the position of pendulous member 22. Knob 64 is rotated clockwise to obtain a shorter focus or counterclockwise to approach an infinity focus. Since knob 64 is directly attached to pendulous member 22, rotation of knob 64 results in a corresponding rotation of pendulous member 22 with a corresponding forward or rearward movement of positioning pin 38 and focusing element 18 of the objective lens system. Automatic focusing lever 42 and spring 54 maintain positioning pin 38 in frictional engagement with cam surface 32 during rotation of pendulous member 22 so that positioning pin accurately follows the cam surface and adjusts focusing element 24 to focus the image of a subject at the desired distance on the film plane of the camera.

The rotation of knob 64 overcomes the frictional drag produced by frictional brake 82 acting on braking surface 34. The frictional drag produced by frictional brake 82 restrains pendulous member 22 against free movement while being manually adjusted and thus permits positive positioning of the pendulous member by the manual control. The correct focus will be read by observing pointer 28 in window 30 or any other reference mark as desired. The amount of rotation of knob 64 is limited by limiting surfaces 68 and 70 of limiting member 66 which engages the bottom edge 71 of limiting plate 72 when pendulous member 22 has reached either the infinity or maximum short focus position.

Thus, the invention provides a manual control which directly transmits force applied to it to the pendulous member for directly moving the pendulous member at all times so that the manual control can be used immediately without the need of being turned on or without the necessity of first engaging the manual control with the pendulous member. The invention also provides an automatic control which can be used immediately without the need of being turned on or without the necessity of disengaging a manual control. The manual control maintains complete control when moving toward or away from infinity and uses the same cam as the automatic control.

The invention in its broader aspects is not limited to the specific details shown and described, and departures may be made from such details without departing from the principles of the invention and without sacrificing its chief advantages.

What is claimed is:

1. A range determining device for use with an optical instrument having a housing and an objective lens system having a focusing element, the device comprising:
   a pendulous member for selective conditioning between a free-swinging first condition and a retained second condition;
   a cam surface on said pendulous member;
   focusing element positioning means engageable with said cam surface for moving the focusing element;
   means for continuously urging said positioning means toward said cam surface; and
   control means accessible externally of said housing and always engaged with said pendulous member to permit force applied to the control means to be directly trasmitted to the pendulous member for swinging the pendulous member throughout its entire range of focus.

2. The range determining device according to claim 1, including a brake engageable with said pendulous member for retaining said member in said retained second condition, the retaining force of said brake being sufficient to prevent inadvertent movement of the pendulous member but being insufficient to prevent movement of the pendulous member by the control means so that the control means can positively position the pendulous member whenever said positioning means is engaged with said cam surface, said brake being disengageable from said pendulous member to permit said pendulous member to assume its free-swinging first condition when the positioning means is disengaged from the cam surface.

3. The range determining device according to claim 2, wherein the pendulous member includes a radial slot that forms a ring-like portion having a braking surface and said brake is engageable with said braking surface.

4. The range determining device of claim 3, including coupling means to selectively urge said brake into engagement with said pendulous member.

5. The range determining device of claim 4, wherein said coupling means includes a brake lever connected to said brake and movable between a first position where said brake engages said pendulous member and a second position where said brake is disengaged from said pendulous member.

6. The range determining device of claim 5 wherein said coupling means includes a spring for urging said lever in said first position.

7. The range determining device of claim 5, including disengaging means for pivoting the coupling means to the second position where the brake is disengaged from the pendulous member.

8. The range determining device according to claim 5, wherein said lever has a downwardly extending projection and wherein said lever is pivoted about the intersection of the projection with the remainder of the lever.

9. The range determining device according to claim 8, including a means for engaging said projection to pivot said lever to said second position.

10. The range determining device according to claim 8, wherein the focusing element positioning means is engageable with said projection for pivoting said lever to said second position.

11. The range determining device of claim 1, wherein said control means comprises a knob which extends externally of the housing and a limiting member connected to said knob.

12. The range determining device of claim 11, including a limiting plate positioned adjacent said limiting member and engageable with said limiting member for positively limiting the rotation of said control means.

13. A range determining device for use with an optical instrument having a housing and an objective lens system having a focusing element, the device comprising:
   a pendulous member supported by the housing for selective conditioning between a free-swinging first condition and a retained second condition, the pendulous member having a radial slot that forms a ring-like portion having a braking surface;
   a cam surface on said pendulous member;

a focusing element positioning pin frictionally engageable with said cam surface for moving the focusing element;

means engaged with said positioning pin for continuously urging said positioning pin toward said cam surface;

a manual control always engaged with the pendulous member to permit force applied to the manual control to be directly transmitted to the pendulous member for directly moving the pendulous member at all times, the manual control comprising a knob which extends externally of the housing and a limiting member which connects the knob to the pendulous member; and a frictional brake engageable with the braking surface for retaining said pendulous member in said retained second condition, the retaining force of said brake being sufficient to prevent inadvertent movement of the pendulous member but being insufficient to prevent movement of the pendulous member by said manual control so that the manual control can positively position the pendulous member whenever said positioning pin is engaged with said cam surface.

14. A range determining device for use with an optical instrument having a housing and an objective lens system having a focusing element, the device comprising:

a pendulous member supported by the housing for selective conditioning between a free-swinging first condition and a retained second condition, the pendulous member having a radial slot that forms a ring-like portion having a braking surface;

a cam surface on said pendulous member;

a focusing element positioning pin frictionally engageable with said cam surface for moving the focusing element;

a focusing lever extending externally of the housing and having a substantially U-shaped groove for receiving the focusing element positioning pin;

a spring engaged with the focusing lever to continuously urge the focusing lever against the positioning pin so that the positioning pin is held against said cam surface;

a manual control secured to the pendulous member to permit force applied to the manual control to be directly transmitted to the pendulous member for directly moving the pendulous member at all times, the manual control comprising a knob which extends externally of the housing and a limiting member which connects the knob to the pendulous member; and a frictional brake engageable with the braking surface for retaining said pendulous member in said retained second condition, the retaining force of said brake being sufficient to prevent inadvertent movement of the pendulous member but being insufficient to prevent movement of the pendulous member by the manual control so that the manual control can positively position the pendulous member whenever said positioning pin is engaged with said cam surface.

* * * * *